June 15, 1943. H. A. COLE 2,322,189
AUTOMATIC KNOCKER FOR FERTILIZER MIXERS
Filed May 9, 1942
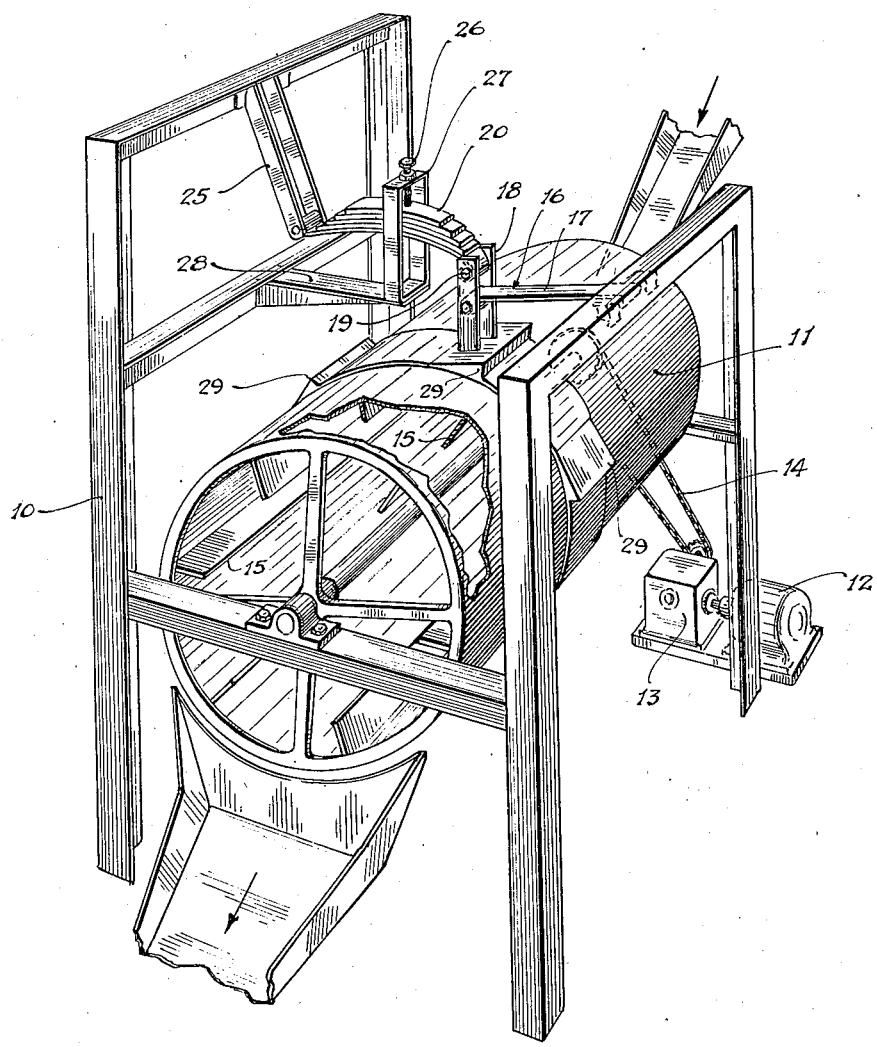
ATTEST-
Harry A. Cole
INVENTOR
BY R. G. Story
ATTORNEY Patented June 15, 1943

2,322,189

UNITED STATES PATENT OFFICE 2,322,189

AUTOMATIC KNOCKER FOR FERTILIZER MIXERS

Harry A. Cole, Baltimore, Md., assignor to Industrial Patents Corporation, Chicago, Ill., a corporation of Delaware Application May 9, 1942, Serial No. 442,317

2 Claims. (Cl. 259—1)

This invention relates to a mixing apparatus and more particularly to a machine for mixing fertilizer materials.

It is an object of this invention to provide a machine for producing a superior fertilizer mix by causing the ingredients to be more thoroughly intermingled.

It is another object of this invention to provide a machine which will complete a mixing operation more rapidly and easily than can be accomplished in the machines now available.

It is another object of this invention to provide a single machine which may be used to produce a plurality of fertilizer mixes.

The drawing accompanying this description shows the preferred construction in perspective.

As fertilizers have been mixed in the past, it has been the practice to supply the ingredients to a rotating drum, in which they are tumbled around to be thoroughly intermixed, and when the process has been completed, the finished fertilizer mix is run from the drum. In certain mixes, liquids containing nitrogen and free ammonium are added to the basic fertilizer materials and it has been found that these liquids render the mass of base materials sticky or tacky so that it adheres to the walls of the drum. Therefore, at certain times during the mixing process, it is necessary to tap the drum to free these masses from the walls so that a thorough intermixture will result.

Manual tapping has been performed and is quite satisfactory except for the expense involved in employing a laborer to perform the necessary acts. Mechanical devices have been proposed and in one such machine, the dropping of weights under the influence of gravity against the drum to free the sticking mass has been tried but this construction is not satisfactory in every respect because, depending upon the formula being mixed the blow struck must be varied over a rather wide range. In using a machine of the freely falling hammer type, the strength of the blow cannot be readily varied and a wide variety of mixes cannot easily be prepared in the one machine.

The present invention is an improvement on the mechanical type tapper and provides a driven hammer for striking the drum and embodies means in the hammer driving system for adjusting the force of the striking blow.

Referring to the machine forming the subject of the present invention and shown in the drawing, the frame 10 supports the rotatable drum 11 in suitable bearings. A motor 12 driving through the reducing gears 13 and drive belt 14 causes the drum to revolve. The drum 11 may have baffles or flights 15 integrally secured to the inside thereof to insure complete mixing and it is evident that these flights tend to encourage the materials being mixed to pack or stick against the wall of the drum.

The drum may be provided with inlet and outlet openings at opposite ends and may be operated to mix batches or to continuously agitate materials passing therethrough. If the drum is operated on the continuous basis, it should be disposed at a slight angle to feed the ingredients from the inlet to the outlet and may be provided with suitable inlet and outlet chutes to handle the product.

After the ingredients have been placed in the drum and mixing has been started, the material adhering to the drum is loosened therefrom, as the drum revolves, by means of the hammer 16 which is pivotally mounted on one side of the frame 10. The hammer 16 includes an arm 17 which is normally disposed approximately horizontally and a head 18 pivotally affixed to the arm at right angles thereto. The head 18 has a substantial length and at its upper end it is pivotally connected through a pin 19 to the leaf spring 20.

The leaf spring is pivotally mounted at its opposite end from a beam 25 fixed to the frame whereby the spring is disposed in a generally horizontal plane, and intermediate its ends, the spring bears against an adjusting nut 26 which is threadedly engaged in the yoke 27. The yoke is supported from the frame 10 by the platform 28 integral with the frame.

Disposed around the periphery of the drum and directly under the path traced by the hammer during the rotation of the drum are a plurality of risers 29 which have inclined lifting faces to raise the hammer as the drum rotates and after lifting the hammers, the risers are designed to suddenly release the hammer so that it may be driven downwardly against the surface of the drum as it passes from under the hammer.

A wear plate may be disposed around the periphery of the drum to take the wear occasioned by the hammer dragging on the surface of the drum or if desired only a striking pad need be provided adjacent each riser. However, to avoid injury to the drum, provision should be made to receive the force of the hammer's blow and yet transmit the energy to the drum to knock the packed material loose.

The operation of the machine will be readily visualized from the description given above taken in connection with the machine shown in the drawing. As the drum rotates, the hammer is raised by the inclined surfaces of the risers 29 and upon continued rotation, the risers pass from under the hammers so that the leaf spring 20 forcibly drives the hammer downwardly to cause it to strike against the drum to free the masses sticking against its surface.

It will be noted that the spring and hammer are pivoted about bearings fixed to the frame in substantially the same horizontal frame. Thus as these two relatively rigid elements rotate about their pivots, it is essential to provide means to permit slight movement longitudinally one with respect to the other. To accomplish this the head 18 of the hammer is pivotally secured to the arm 17 and the pin 19 which connects the spring to the head is displaced somewhat from the pivotal connection between the hammerhead 18 and the arm 17 so that the necessary relative longitudinal movement can take place. With this construction, the head 18 will rotate slightly about its pivotal connection on the arm 17 as the hammer is moved upwardly by the risers 29 and downwardly by spring 20.

In practicing this manner of mixing fertilizers, it has been found, upon changing the proportions of the mix and in adding various quantities of liquids, that blows of different intensity are required to free the packed material from the drum surface. Variations in the stickiness of the materials being mixed to produce the different formulas are encountered and these variations cover a rather wide range thus requiring blows of different intensity to knock the materials loose. To effectively accomplish an adjustment of the strength of the blow, the adjusting screw 26 may be caused to bear against the upper surface of the leaf spring to depress it more or less as a greater or less striking force is required. It will be seen that a very small adjustment of the screw 26 will effect a great difference in the striking blow and the required adjustment may be made quite easily. It is important in mixing fertilizer materials that too heavy a blow be not struck in order that the machine may have a reasonable life. An unduly heavy blow would cause the drum to be subjected to unnecessary wear and the adjustable feature has been provided to avoid this contingency as well as to make the machine operative to handle a wide range of possible mixtures.

This construction provides a very simple means for accomplishing the desired loosening of the material caked on the inner surface of the drum and many modifications will occur to those skilled in the art, all of which are comprehended to be within the scope of the following claims.

I claim:

1. A mixer for fertilizer materials and the like comprising a frame, a rotating drum supported in said frame to receive the ingredients to be mixed, said drum being disposed with its axis directed generally horizontally, a driven hammer for striking said drum at spaced points to knock the ingredients adhering thereto off of the drum, said hammer being pivotally mounted on said frame and extending generally horizontally therefrom, a head for said hammer, said head extending vertically and being pivotally connected to the end of said hammer, resilient means for driving the hammer against the drum, said resilient means including a longitudinal member extending generally horizontally from the frame and being pivotally connected to said head at a point spaced from said first named pivotal connection of the head to the hammer, means to rotate said drum, and risers spaced around the periphery of said drum to lift said hammer away from the drum and compress said resilient means so that when the hammer passes off of the riser it is driven against the drum, and said hammerhead being pivotally connected between the hammer and the longitudinal member to permit the hammer to be lifted by said riser.

2. A mixer for fertilizer materials and the like comprising a frame, a rotating drum supported in said frame to receive the ingredients to be mixed, a driven hammer for striking said drum at spaced points to knock the ingredients adhering thereto off of the drum, said hammer being pivotally mounted on said frame and including a striking arm extending longitudinally therefrom, a head for said hammer positioned to strike said drum, said head extending at substantially right angles to the longitudinal striking arm of said hammer, said head being pivotally connected to the end of the striking arm of said hammer, resilient means for driving the hammer against the drum, said resilient means including a longitudinal member extending in a generally parallel direction with respect to the longitudinal direction of said striking arm and being pivotally connected between said head and the frame of the machine, said resilient member being connected to said head at a point spaced from the pivotal connection between said head and the striking arm of the hammer, means to rotate said drum, and means to lift said hammer away from the drum to compress said resilient means so that when the hammer is released it is driven against the drum, said hammerhead being pivotally connected between the striking arm and the resilient member to permit the hammer to be lifted.

HARRY A. COLE.